United States Patent [19]
Thirant

[11] 4,240,712
[45] Dec. 23, 1980

[54] THERMO-OPTIQUE SMECTIC LIQUID-CRYSTAL STORAGE DISPLAY

[75] Inventor: Lydie Thirant, Paris, France

[73] Assignee: Thomson-CSF, Paris, France

[21] Appl. No.: 9,092

[22] Filed: Feb. 2, 1979

Related U.S. Application Data

[63] Continuation of Ser. No. 867,459, Jan. 6, 1978, abandoned, which is a continuation of Ser. No. 643,866, Dec. 23, 1975, abandoned.

[30] Foreign Application Priority Data

Dec. 24, 1974 [FR] France .................. 74 42640

[51] Int. Cl.³ ............................................. G02F 1/133
[52] U.S. Cl. .................................. 350/351; 350/350 S
[58] Field of Search ......................... 350/351, 350 S

[56] References Cited
U.S. PATENT DOCUMENTS 3,796,999  3/1974  Kahn .................. 350/351 X Primary Examiner—Edward S. Bauer
Attorney, Agent, or Firm—Cushman, Darby & Cushman

[57] ABSTRACT

The invention describes a liquid crystal display device with storage and local erasure, utilizing a thermo-optical effect to write an image under the form of scattering points in a layer of a material exhibiting a smectic mesophase. The energy necessary for the writing of the image is considerable reduced by effecting the change from the transparent to the scattering state without leaving the smectic mesophase. This result is obtained by treating the walls enclosing the layer so as to impart to smectic material a first given uniform orientation and imposing it, by the action of an electric field, a second uniform orientation perpendicular to the first; under local heating to a temperature in the neighborhood of the smectic-nematic transition temperature, the material tends to take up again the orientation imparted by the walls, thus locally generating a scattering structure.

21 Claims, 2 Drawing Figures

THERMO-OPTIQUE SMECTIC LIQUID-CRYSTAL STORAGE DISPLAY

This is a continuation, of application Ser. No. 867,459 filed Jan. 6, 1978 which is a Rule 60 continuation of Ser. No. 643,866 filed Dec. 23, 1975 both now abandoned.

FIELD OF THE INVENTION

This invention relates to optical storage and display devices, and more particularly to a liquid crystal device in which a thermo-optical effect and an electric field are utilized for respectively writing and erasing an image in a thin layer of a material having a smectic phase.

BACKGROUND OF THE INVENTION

In the prior art, it is known that profound changes in the optical properties of liquid crystals, particularly for optical display purposes, can be obtained not only by applying thereto electric fields (electro-optical effects), but also by subjecting them to temperature variations (thermo-optical effects).

A first method consists in forming a cell by disposing between two transparent plates a uniformly oriented, and therefore completely transparent, thin layer of a material in the smectic phase. A light beam, generally chosen from the near infra-red range and intensity-modulated by the video signal transmitting the image to be written, scans the cell point-by-point. When the energy supplied at a point by the beam has been sufficient to locally change the thin layer from the smectic to the isotropic liquid phase, a disordered texture appears during the ensuing cooling back of the layer, producing optical scattering properties of this point; on the other hand, the points where the luminous energy of the modulated beam has been insufficient to bring about the fusion retain the uniform ordered structure and remain transparent. The image is thus written in the form of scattering spots on a transparent background.

It is possible to erase selectively a part of the recorded image. For this purpose, a unidirectional or preferably alternating electric field is applied to the whole layer, while the light beam, which again scans the cell, again brings into the isotropic liquid phase those spots which are to be erased. On the subsequent return to the smectic phase, the field orients the molecules, which are restored to the initial transparent ordered structure.

This method involves the use of a high-power radiation source, because the quantity of heat which must supplied to the layer to bring it into the scattering condition is considerable, since, generally, the transition from the smectic to the liquid phase is not direct, but takes place by way of a nematic phase. Consequently, the temperature difference which must be passed through is considerable, and, in addition, it is necessary to supply the latent heats for the change of state from the smectic to the nematic phase and from the nematic to the isotropic liquid phase.

It has therefore been proposed, in order to reduce the power required from the light source, to replace the material in the smectic phase by a mixture of materials in the nematic and cholesteric phases. The transition into the isotropic liquid phase is then direct. However, selective erasure of the image is no longer possible, because when these mixtures are subjected to an electric field, they become reoriented independently of any heating; consequently, when the electric field is applied, it reorients the whole of the layer, whereby the erasure is made total.

Finally, in a third method by means of which it is also possible to reduce the power required from the radiation source, use is made of the property possessed by certain materials having a smectic phase of exhibiting, when cooled from the isotropic liquid phase, a texture whose disorder is controllable by the electric field applied to the layer. The cell is then swept by a beam of constant intensity, the video signal modulating the applied electric field. It is possible by this method to omit the beam modulator, which results notably in a substantial reduction in the power required from the light source.

It nevertheless remains true that, by reason of the fact that these various methods involve at least one change from one phase to another, with the corresponding latent heat required for the change of state, they necessitate the application of considerable energy to the thin layer by the light beam.

SUMMARY OF THE INVENTION

It is therefore an object of this invention to provide a novel liquid crystal display.

It is a further object of the invention to provide a thermo-optical method of considerably reducing the optical energy required in the writing of an image in a thin layer of smectic material.

It is yet another object of the invention to provide a method of achieving the change from a transparent to a scattering structure without leaving the smectic mesophase, and therefore without having the supply the latent heat for the corresponding change of state.

Another object of the invention is to provide a storage display device wherein the energy to achieve the change from a transparent to a scattering layer is sufficiently low for a simultaneous optical writing of all the points of an image to be possible.

Still another object of the invention is to provide a storage display device wherein either local or total erasure are achieved by application of an electric field to the whole liquid crystal layer with or without simultaneous local heating.

BRIEF DESCRIPTION OF THE DRAWING

This invention, together with its features, advantages and objects, can be better understood from the following detailed description when read in conjunction with the drawing in which.

DESCRIPTION OF THE PREFERRED EMBODIMENTS

Figure 1:
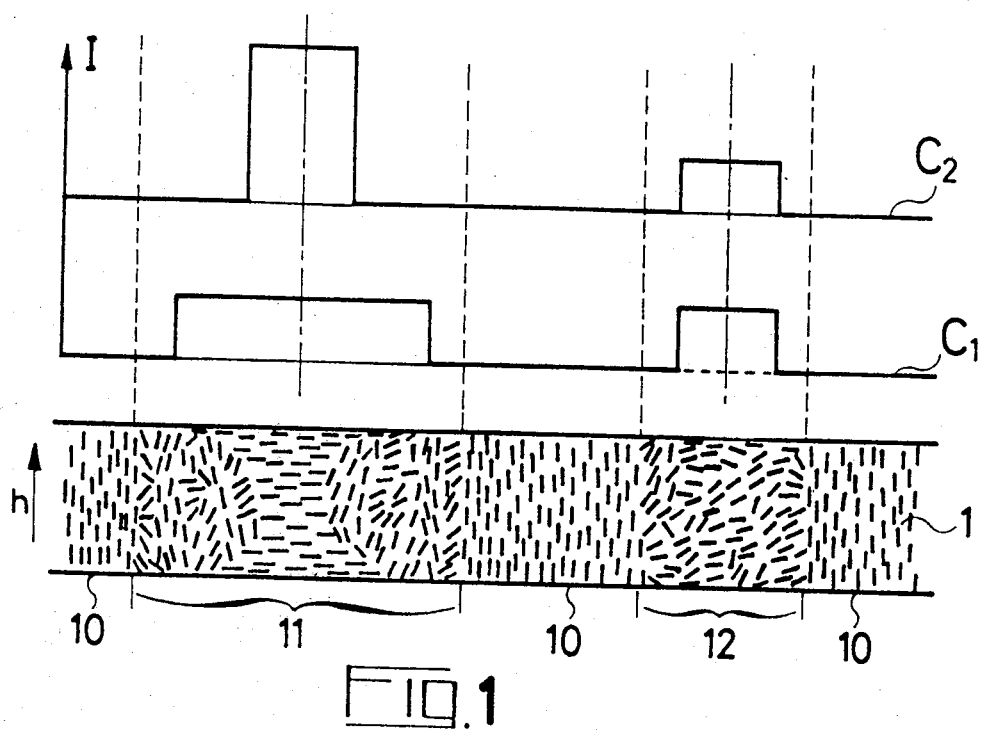
FIG. 1 illustrates the modifications in the structure of a layer of material as a result of local heatings, in accordance with the invention.

The smectic structure is divided into two groups: smectic structure A and smectic structure C, both of which are characterised by the arrangement of the long molecules along equidistant parallel planes; in the first (A), the long molecules have their axis oriented perpendicularly to these planes, while in the second (C) the axes are more or less inclined in relation to the planes.

As in the other mesomorphic states, the modifications of the uniform orientation of a thin layer in the smectic phase result, from the optical viewpoint, in a change in the transparency. While a thin, uniformly oriented layer is completely transparent, the formation of domains having distinct orientations within the layer results in the concomitant appearance of a scattering state which is all the more marked as the differences in orientation are greater.

Materials having a smectic mesophase and suitable for thermo-optical effect do not generally exhibit a direct transition from the smectic mesophase to the isotropic liquid phase. Thus, when the temperature of a material in the smectic mesophase is raised, a first transition temperature is observed, at which the material changes from the smectic to the nematic mesophase, as well as a second at which the material changes from the nematic mesophase to the isotropic liquid phase.

It is known that, as in the other mesomorphic phases, it is possible to impart to the long molecules constituting the material in the smectic structure a predetermined orientation in relation to the walls between which the liquid layer is enclosed, by applying an appropriate surface treatment to the said walls prior to the introduction of the mesomorphic material. In order to orient the molecules in parallel relationship to the walls, there may be deposited upon the latter, by evaporation under grasing incidence, a thin layer of silicon monoxide. It is also possible to cover them with a thin film of coating agent such as M.A.P. (n-methyl-3-aminopropyltrimethosysilane) or to use the Chatelain rubbing method. With regard to the orientation of the molecules perpendicular to the support, it may be obtained by means of other types of coating agent, such as D.M.O.A.P. (—m-n-dimethyl-n-octadecyl-3-aminopropyltrimethoxysilane chloride).

It is also known that the long molecules which constitute the materials exhibiting mesomorphic states are highly polarisable, and therefore capable of being oriented, under certain conditions, under the influence of an electric field. A distinction is drawn between molecules having positive dielectric anisotropy, in which that component of the polarisation which is induced along the axis of the molecule is greater than the component along the perpendicular to the axis, and which tend to become oriented parallel to the applied electric field, and molecules having negative dielectric anisotropy, in which the component along the axis is smaller than the component along the perpendicular to the axis and which tend to become oriented in perpendicularly to the field.

It is known from the prior art to utilise this effect of the electric field to obtain a uniform orientation of all or part of a thin layer in the smectic phase. For this purpose, the temperature of the zone to be oriented in the thin layer is raised until the material passes into the nematic or isotropic liquid phase. The electric field applied to the thin layer in the cooling to the smectic phase uniformly orients the molecules. This state of uniform orientation, by which the corresponding zone is rendered transparent, is maintained when the field ceases to be applied. It is also known from the work done in the Applicants' laboratories that some materials which have a smectic state A, notably those of the diphenyl-nitrile family, are capable of being brought into the state of uniform orientation by an applied field without having to be passed through another phase, i.e. a nematic or isotropic liquid phase. In all cases, the electric field can be unidirectional or alternating, an alternating field preferably being chosen in order to minimise the electromechanical effects which are detrimental to the material.

Recent research made in the Applicants' laboratories has led to the following conclusions, which are applied in the present invention: when a thin layer of a material having a smectic mesophase, which is disposed between walls which have undergone an appropriate surface treatment for imparting uniform orientation to the molecules of the crystal, and then has been temporarily subjected, as indicated in the foregoing, to an electric field for reorienting all the molecules in a direction perpendicular to that imparted by the walls, is brought to a temperature slightly below the temperature at which the change from the smectic to the nematic state occurs, the molecules are spontaneously reoriented in accordance with the initial orientation imparted by the walls. If only some portions of the smectic layer are heated, the reorientation takes place only in these regions, and it is found that the junction zone between the reoriented regions and the others scatters light. The heated region, if sufficiently punctiform, is entirely occupied by the transition zone, and the whole point appears as a scattering zone. This effect can be observed as long as the diameter of the heated region does not exceed three to four times the thickness of the layer.

It is proposed in accordance with the invention to utilise these results for writing an image in a thin layer of smectic crystal in the form of juxtaposed scattering points. The recording of the half-tints is then obtained either by controlling the spacing of the points or by controlling their diameter.

FIG. 1 illustrates in very diagrammatic form the structural modifications of a layer of material in the smectic state, which has undergone the structural modifications due to local heating, as well as the spatial distributions of the energy, for example luminous energy, which have brought about these structural modifications.

In the lower part of the Figure, there may be seen a thin layer 1 of a smectic material having positive dielectric anisotropy. A coating agent (for example M.A.P.), arranged on the walls of the transparent plates (not shown in the figure between which the layer is enclosed, generates surface forces which tend to orient the molecules (represented by short strokes in the Figure) in a direction parallel to the plane of the layer. An electric field h, perpendicular to the plane of the layer, has been applied so as to orient the molecules uniformly and perpendicularly to the walls, this orientation being apparent from the regions denoted by 10. These regions, which have not undergone any heating, have retained their uniform orientation and are transparent. On the other hand, in the regions denoted by 11 and 12, which have undergone temporary heating at a temperature slightly below the temperature at which the change from the smectic to the nematic mesophase occurs, whereby the viscosity has been reduced, the molecules have tended to become realigned in parallel relationship with the walls. This realignment is total at the centre of the region 11, which is the wider, and the junction between the two parallel and perpendicular orientations takes place by means of a macroscopically disordered structure, called "focal conic" structure, which diffuses light. If the heated region is sufficiently narrow, which is the case with the region 11, the focal conic structure appears alone. The two regions 11 and 12 appear in the form of scattering points, the diameter of the point 11 being greater than that of the point 12.

The curves denoted by C1 and C2 located in the upper part of FIG. 1 show the space distribution of the luminous intensity which has produced the heating of the layer 1. On the curve C1, the luminous intensity utilised is the same for the two regions 11 and 12, but covers a greater area at 11 than at 12. On the other hand, on the curve C2, intensities of different values have illuminated regions of the same area. Owing to the thermal diffusion within the layer, the reoriented volume is greater as the luminous intensity is higher. An equivalent result could be obtained by supplying to points of equal area a like quantity of heat per unit time for longer or shorter times.

Figure 2:
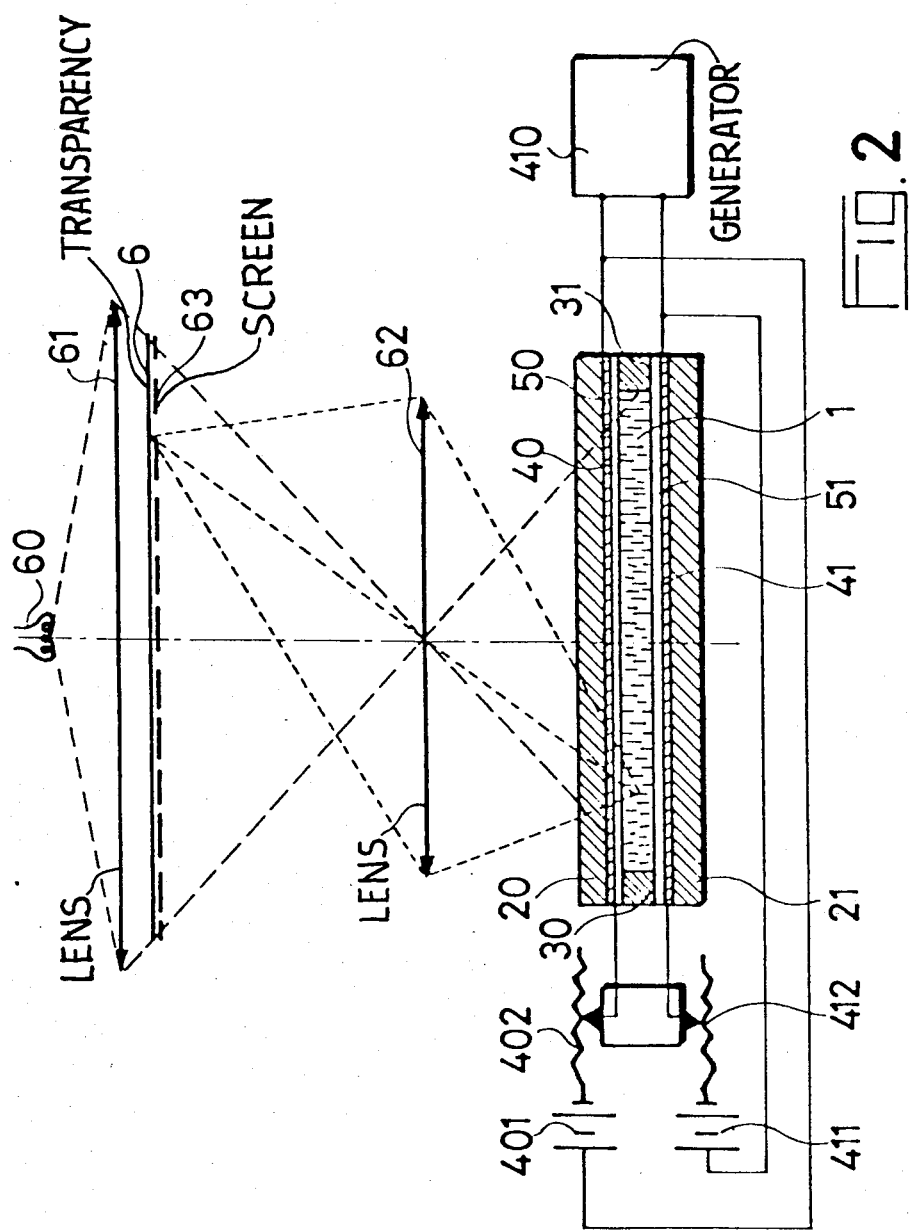
FIG. 2 is a diagram, partly in cross section, of an optical display device, in accordance with the specific embodiment of this invention.

FIG. 2 illustrates a specific example of the construction of an apparatus according to the invention by means of which it is possible to record an image in a thin layer of a material in the smectic mesophase.

A thin layer 1 of octyl-nitrile-4-4'-diphenyl of a thickness of about 20μ is enclosed between two parallel glass plates 20 and 21 maintained at the required spacing by distance pieces 30 and 31. On the inside faces of the plates, two uniform deposits 40 and 41 of tin oxide, both of like resistivity, perform the function of transparent electrodes. They are in turn coated with a film of M.A.P. 50 and 51, which forms the interface between the tin oxide and the thin layer 1.

By means of two identical voltage sources 401 and 411, there are applied between the two ends of each electrodes 40, 41 a like potential difference, which is adjustable by means of two coupled rheostats 402 and 412. A current of variable strength thus flows through the two electrodes, so that the temperature of the thin layer 1 can be adjusted by Joule effect while a constant potential difference can be maintained on either side of the said thin layer. An adjustable voltage of a frequency of about 10 kHz can be applied between the two electrodes 40 and 41 by means of an alternating-voltage generator 410.

The image to be projected consists of a transparency 6, which is introduced into a conventional projector comprising a light source 60, a condensor 61 and a projection lens 62, which forms the image of the transparency 6 in the plane of the thin layer 1.

The transparency 6 may consist of an image which has previously been passed through a half-tone screen. In this case, it may be directly recorded in the thin layer. For recording an unscreened image, a half-tone screen 63 recorded, for example, on a photographic plate, is disposed in the immediate neighbourhood of the transparency 6. The spacing between the holes in this regular array forming this screen is such as when projected into the plane of the layer 1, to be of the order of the thickness of the layer, i.e. about 20μ.

The rheostats 402 and 412 are so adjusted that the temperature of the layer is maintained in the neighbourhood of 26° C. The octylnitrile 4-4'-diphenyl, the solid-smectic and smectic-nematic transition temperatures of which are 20° C. and 32° C. respectively, is thus maintained in the smectic mesophase.

The light source 60 having been extinguished, an alternating voltage of the order of 40 V is applied between the electrodes 40 and 41 by means of the generator 410 for a brief period of time, which should not exceed a few milliseconds. The electric field thus created perpendicularly to the plane of the layer 1 orients the molecules, the dielectric anisotropy of which is positive, parallel to itself. The layer 1 thus uniformly oriented is uniformly transparent.

The light source 60 is then lit up so as to project the image of the transparency 6 into the plane of the layer 1. That spectral part of the projected light which is situated in the near infra-red is absorbed by the tin oxide constituting the electrodes 40 and 41, and the heat evolved is imparted to the adjacent layer 1. In the heated parts, the molecules tilt and tend to become rearranged in parallel relationship to the walls. The projected image thus constitutes a means of selectively heating the layer. Due to the screen 63, it is composed of a juxtaposition of luminous dots of constant spacing, of equal area and of variable intensity, which corresponds to the case represented by the curve C2 of FIG. 1. It is reproduced in the layer 1 in the form of scattering points of constant spacing, the diameter of which is greater in proportion as the corresponding luminous dot in the projected image is more brilliant and therefore as the temperature reached by the layer at the centre of the dot is higher. The recording threshold depends upon the time during which it is desired to project the image. The rearrangement of the molecules manifests itself as soon as the temperature of the dot exceeds 29° C., and takes place more rapidly in proportion as the temperature approaches 32° C., corresponding to the smectic-nematic transition. If an exposure time in the neighbourhood of 1 second is chosen, the energy to be supplied to the layer is of the order of a millijoule/cm$^2$; i.e. about 9 nanojoules per dot.

The image thus recorded can be retained for a period which may exceed a number of weeks. It is possible to erase it selectively. For this purpose, the points to be erased are brought to a temperature between 29° and 32° C., while a voltage of the order of 10 V is applied between the electrodes 40 and 41 by means of the generator 410. The electric field thus applied rearranges parallel to itself the molecules of the heated points, whereby the latter are rendered transparent again. The heating of the points to be erased can be effected by substituting for the transparency 6 an opaque mask comprising in transparent form the regions to be erased in the thin layer; the screen 63 is then withdrawn, and the source 60 is lit up while the layer 1 is subjected to the action of the electric field. It is also possible, after withdrawal of the transparency 6 and of the screen 63, and extinction of the source 60, to shift a point-form light source in the plane which contained the transparency 6, the lens 62 thus projecting an erasing luminous spot on to the layer 1. This same method may be used for overprinting items of information on an image which has already been recorded. The alternating voltage is then no longer applied between the electrodes, and the screen is brought into position.

For totally erasing the written image, the layer 1 is restored to its uniformly transparent state by means of the previously described procedure, the source 60 being extinguished and a voltage of the order of 40 V being applied between the electrodes 40 and 41 by means of the generator 410.

Without departing from the scope of the invention, it is possible to employ, for the formation of the thin layer 1, a material having a smectic state A without possessing the property, exhibited notably by materials of the diphenyl-nitrile class, of being able to be brought into a state of uniform orientation without passing through another phase. For uniformly orienting the layer 1, the adjustment of the coupled rheostats 402 and 412 is changed, the voltage across the terminals of the electrodes 40 and 41 being increased so as temporarily to bring the temperature of the layer 1 to a value slightly above the smectic-nematic transition temperature which is characteristic of the material employed. The layer 1 is then subjected by means of the generator 410 to a voltage of the order of 1 volt per micron thickness, while its temperature, is lowered again by means of a further adjustment of the coupled rheostats so that the material is restored to the smectic state. The writing then takes place in accordance with the previously described process. In order to obtain the selective erasure, the aforesaid procedure is again followed, but the intensity of the light source employed for the erasure will then have to be sufficient to bring the dots to be erased from the smectic state to the nematic state. The voltage to be applied to the layer is again of the order of 1 volt per micron thickness.

Materials having a smectic phase C may also be employed, although the uniform orientation of the layer 1 is then more difficult to obtain.

Although one of the major advantages of the present invention resides in that an image can be totally written owing to the high sensitivity of the process, it is also possible to record the information point-by-point in the smectic layer by scanning the latter with a laser beam modulated by a video signal. In this case, the screening of the image may be effected, for example, by superimposing upon the video modulation a second, on-off modulation, at fixed frequency, of the intensity of the scanning beam. Although the writing rate is low (of the order of 50 ms per point, which is the minimum time necessary, with the materials at present known, to bring about the transit of the molecules from one orientation to the other in the absence of an applied electric field), the process makes it possible to use beams whose intensity is about a thousand times lower than that in the apparatus of the prior art.

In the foregoing description, the selective-heating means for writing the image in the layer have been essentially described as optical means utilising the energy carried by a space-modulated light beam. It is also possible within the scope of the present invention to use as selective heating means for the layer 1 a matrix of resistive elements which is controlled by multiplexing, as described in the French Patent application filed by the Applicants on the 21.11.74 under No. 74.38281 corresponding to U.S. Pat. application Ser. No. 632,955, filed on Nov. 18, 1975 now U.S. Pat. No. 4,099,857. This matrix, with the corresponding current supply means, is then laid directly upon one of the support plates, for example 20, between the plate and the electrode 40, from which it is insulated by a thin film, for example of silica.

To sum up, the invention described in the foregoing makes it possible notably to record rapidly an item of information in the form of an image projected by a conventional optical device, to store it, thereafter to cause it to undergo various graphical treatments, such as selective erasure, rewriting of other data in the erased spots and overprinting, and finally to erase it totally in order to permit the recording of a further item of information.

The recorded image may be projected on to a screen using the known devices for the projection of images written in the form of diffusing points onto a transparent background. It may at the same time be freed from the screen by the use of conventional space frequency filtering means. If it is desired to use a lighting source which is sufficiently powerful for projection on to a screen of large dimensions, the radiation emitted by the source will be chosen from the wavelength ranges which are not absorbed by electrodes or by the material of which the thin layer consists.

What we claim is:

1. A method utilizing a thermo-optical effect for storing images in the form of light scattering points in a thin layer of a material exhibiting a smectic mesophase in a first temperature range and comprising the steps of:
   (a) enclosing said layers between walls for imposing to said layer a first uniform orientation;
   (b) temporarily applying to said layer a first electric field for substituting for said first uniform orientation a second uniform orientation perpendicular thereto;
   (c) maintaining said layer to a first value in said first temperature range;
   (d) temporarily raising the temperature of at least parts of said layer from said first value to a second value in said first temperature range.

2. A method as recited in claim 1 in which during the step (b), said layer is in said smectic mesophase.

3. A method as recited in claim 1, in which, said material further exhibiting a nematic mesophase in a second temperature range, the temperature of said layer is lowered from the second to the first temperature range during the step (b).

4. A method as recited in claim 2, further comprising the steps of temporarily raising the temperature of portions of said layer from said first value to a value substantially equal to said second value, while simultaneously applying a second electric field to said layer.

5. A method as recited in claim 3, further comprising the step of temporarily raising the temperature of portions of said layer from said first temperature range to said second temperature ranges while simultaneously applying a third electric field to said layer.

6. A method as recited in claim 2, wherein said material comprises at least one compound of the family of diphenylnitriles.

7. A method as recited in claim 1, wherein one of said first and second uniform orientations is perpendicular to said walls.

8. A method as recited in claim 4, wherein said first and second electric fields are perpendicular to said walls.

9. A method as recited in claim 5, wherein said first and third electric fields are perpendicular to said walls.

10. A device utilizing a thermo-optical effect for storing images in the form of light scattering points in a material exhibiting a smectic mesophase in a first temperature range, and comprising:
    a layer of said material;
    two substrates for enclosing said layer;
    electric field generating means for imposing upon said layer of material a first orientation direction;
    first selective heating means for temporarily raising the temperature of at least parts of said layer from a first to a second value both in said first temperature range; and
    orienting means for promoting a second orientation direction in the parts of said layer raised at said second temperature value, in the absence of said electric field, said first and second orientation directions being substantially perpendicular to each other.

11. A device as recited in claim 10, further comprising non-selective heating means for controlling the temperature of said layer.

12. A device as recited in claim 10, further comprising second selective heating means for temporarily raising the temperature of at least portions of said layer from said first value in said first temperature range to a third value in the presence of said electric field;

13. A device as recited in claim 12, wherein said third value of temperature is a value pertaining to said first temperature range.

14. A device as recited in claim 12, wherein said layer further exhibiting a nematic mesophase in a second temperature range, said third value is a value pertaining to said second temperature range.

15. A device as recited in claim 10, wherein said first selective heating means are optical means.

16. A device as recited in claim 15, wherein said optical means are projecting means for projecting a transparency on said layer.

17. A device according to claim 16, wherein said projecting means comprise a half zone screen.

18. A device according to claim 12, wherein said second selective heating means are optical means.

19. A device according to claim 10, wherein said material comprises at least one compound of the family of diphenylnitriles.

20. A device as recited in claim 10, wherein said orienting means comprises an orienting coating arranged in direct contact with said layer on at least one of said substrates 21. Apparatus utilizing a thermo-optical effect for storing images in the form of light scattering points in a material exhibiting a smectic mesophase in a first temperature range and comprising:

a layer of said material;

walls for imposing to said layer a first uniform orientation;

means for enclosing said layer between said walls;

means for temporarily applying to said layer an electric field for substituting for said first uniform orientation a second uniform orientation perpendicular thereto;

means for maintaining said layer to a first temperature within said first temperature range; and first selective heating means for temporarily raising the temperature of at least parts of said layer from said first temperature to a second temperature in said first temperature range.

* * * * *